(12) United States Patent
Tischler (10) Patent No.: US 7,398,362 B1
(45) Date of Patent: Jul. 8, 2008

(54) PROGRAMMABLE INTERLEAVING IN MULTIPLE-BANK MEMORIES

(75) Inventor: Brett A. Tischler, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 265 days.

(21) Appl. No.: 11/297,859

(22) Filed: Dec. 9, 2005

(51) Int. Cl.
*G06F 12/00* (2006.01)

(52) U.S. Cl. .................... 711/157; 711/206; 711/202

(58) Field of Classification Search .............. None
See application file for complete search history.

(56) References Cited

U.S. PATENT DOCUMENTS 6,381,668 B1 * 4/2002 Lunteren ................. 711/5
6,877,076 B1 * 4/2005 Cho et al. ................. 711/157
2006/0047886 A1 * 3/2006 Leaback .................. 711/5

* cited by examiner

*Primary Examiner*—Hyung Sough
*Assistant Examiner*—Kaushikkumar Patel

(57) ABSTRACT

A method includes receiving a linear address for accessing a multiple-bank memory, determining a first bit location of the linear address based on a first register value, and providing a bank identifier based on a value at the first bit location of the linear address. Another method includes receiving, at a memory controller coupled to a multiple-bank memory, input indicating a mapping of values at identified bit locations of a linear address to corresponding values of a memory address output. The memory address output includes a bank identifier based on a value at one or more of at least three bit locations of the linear address and a value of the input is programmable.

17 Claims, 5 Drawing Sheets

PROGRAMMABLE INTERLEAVING IN MULTIPLE-BANK MEMORIES

FIELD OF THE DISCLOSURE

The present disclosure relates generally to accessing memory locations and more particularly to translating memory addresses.

BACKGROUND

Many processing systems implement linear memory addresses while utilizing memories that are logically and physically arranged in a multiple-dimension, hierarchical manner. To illustrate, dynamic random access memories (DRAMs) and other multiple-bank memories often are organized as multiple memory chip modules, each memory chip module having multiple banks, and each bank being arranged by rows and columns. As such, processing systems typically utilize a single, permanent translation policy to translate a linear memory address into various chip, bank, row and column identifiers for selecting the particular chip module, bank, row and column corresponding to the linear address (a process generally referred to as interleaving). One conventional interleaving policy is a low order interleave (LOI) whereby the least significant bits of the linear address are designated as the bank address used to select the bank (e.g., ADDR[1:0] for memory having four banks per chip module), and to select the row address, column address and chip address from the higher order bits of the linear address. Another conventional interleaving policy is a high order interleave (HOI) whereby the most significant bits of the linear address are designated as the bank address used to select the bank (e.g., ADDR[31:30] for memory having four banks per chip module and a thirty-two bit address space), and to select the row address, column address and chip address from the lower order bits of the linear address.

DRAMs and other multiple-bank memories often incur significant delays when switching between rows of a given bank due to the latencies involved in closing one row and opening the next row of the bank. Typically, each bank can maintain one open row that can be accessed with little or no time penalty, so generally it is advantageous to organize memory accesses so that proximate memory accesses access the same page of any given bank. However, the use of the same permanently fixed interleaving policy for different program streams often results in memory access inefficiencies as a given interleaving policy may work well with one program stream to reduce the occurrence of proximate memory accesses to different rows of the same bank, but the same interleaving policy may result in significant page thrashing for another program stream that accesses memory in a different manner that causes frequent accesses to different rows of the same bank under the same interleaving policy. Accordingly, an improved technique for memory address interleaving in multiple-banked memories would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

The following description is intended to convey a thorough understanding of the present disclosure by providing a number of specific embodiments and details involving memory accesses in multiple-bank memories. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

In accordance with at least one aspect of the present disclosure, a method includes receiving a linear address for accessing a multiple-bank memory and determining a first bit location of the linear address based on a first register value. The method further includes providing a bank identifier based on a value at the first bit location of the linear address.

In accordance with another aspect of the present disclosure, a method includes receiving, at a memory controller coupled to a multiple-bank memory, input indicating a mapping of values at identified bit locations of a linear address to corresponding values of a memory address output. In one embodiment, the memory address output includes a bank identifier based on a value at one or more of at least three bit locations of the linear address and a value of the input is programmable.

In accordance with yet another aspect of the present disclosure, a memory controller includes a register to store a register value and a memory controller coupled to the register and to a multiple-bank memory. In one embodiment, the memory controller is to receive a linear address for accessing a multiple-bank memory, determine a first bit location of the linear address based on a register value, provide a bank identifier to the multiple-bank memory based on a value at the first bit location of the linear address.

FIGS. 1-6 illustrate exemplary techniques for mapping a linear memory address to memory address output used to access a particular memory location in a multiple-banked memory. In one embodiment, the mapping between the linear address and the various chip, bank, column and row identifiers used to access the memory location is programmable either at run-time or at time of implementation. The programming may be accomplished by writing a value to a register or other memory location, by programming a basic input/output system (BIOS), and the like. The mapping typically represents correspondences between bit locations of the linear address and bit locations of the identifiers, where the bit values of at least some of the identifiers, such as the bank identifier or the chip identifier, may be based on a bit values stored at one or more of at least three different bit locations of the linear address. A particular mapping may be selected so as to reduce page thrashing for proximate memory accesses. Further, in one embodiment, the bit values of the various identifiers may be generated based on logic operations, such as exclusive OR operations, performed on one or more of the bit values of the linear address so as to introduce pseudo-randomness to the mapping of the linear address to the various identifiers.

Figure 1:
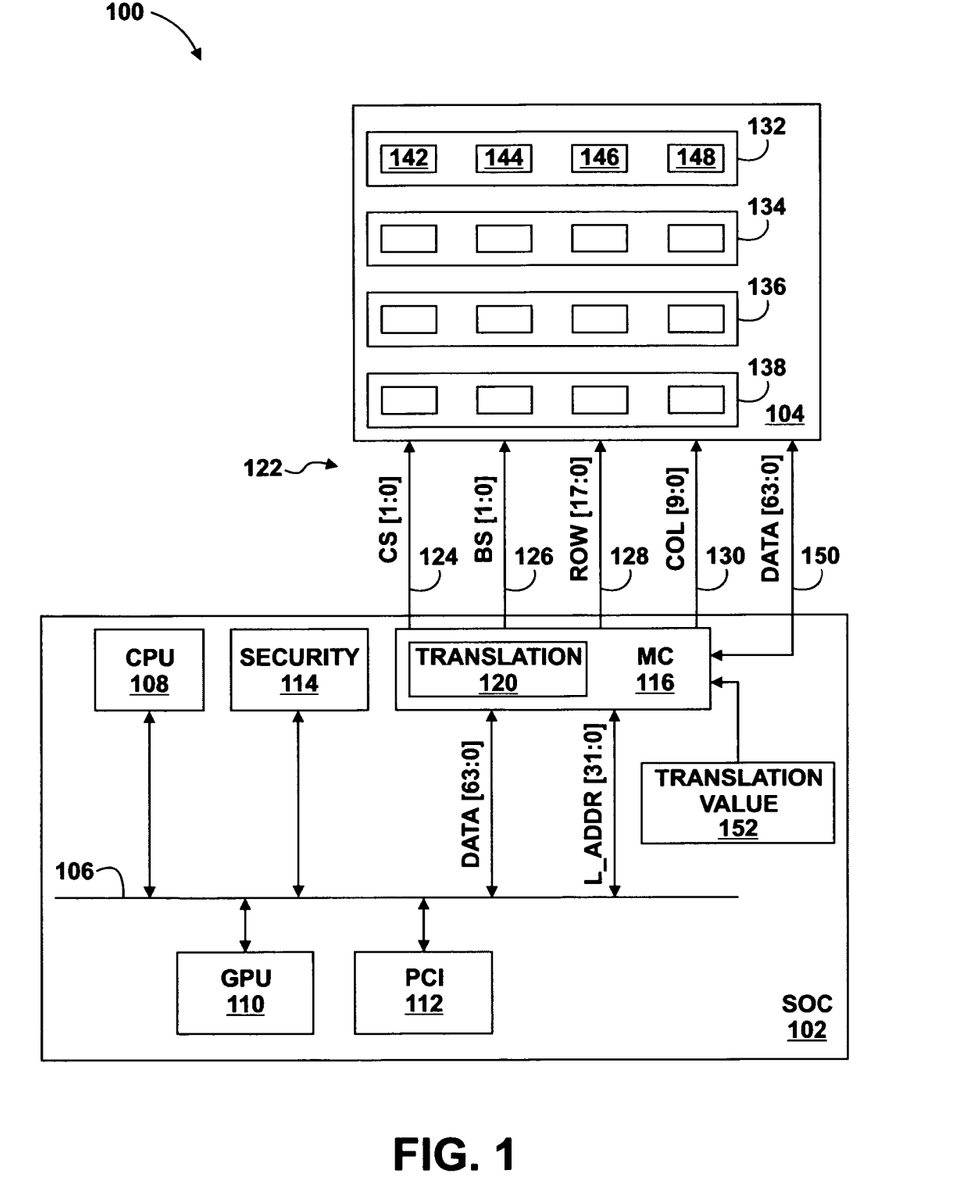
FIG. 1 is a block diagram illustrating an exemplary processing system utilizing programmable memory address interleaving in accordance with at least one embodiment of the present disclosure.

Referring to FIG. 1, an exemplary processing system 100 implementing programmable memory address interleaving is illustrated in accordance with at least one embodiment of the present disclosure. The processing system 100 includes a system-on-a-chip (SOC) 102 or other integrated circuit having one or more processing components, such as, for example, a central processing unit (CPU) 108, a general processing unit (GPU) 110, a peripheral component interconnect (PCI) interface 112 and a security module 114, coupled to a memory controller (MC) 116 via one or more busses 106. The SOC 102 further includes one or more programmable registers 152 or another programmable storage location for storing one or more translation value used by a translation module 120 of the memory controller 116 to implement a particular memory address interleaving mapping.

The processing system 100 further includes a DRAM 104 connected to the processing components of the SOC 102 via the memory controller 116. The DRAM 104 includes a plurality of chip modules, such as chip modules 132, 134, 136 and 138. Each chip module includes a plurality of banks, such as banks 142, 144, 146 and 148. Each bank includes a matrix of memory storage locations addressed by rows and columns. In the illustrated example, the DRAM 104 includes a four chip module, each chip module having four banks, and each bank having approximately 268 million storage locations linearly addressed by a 32-bit value via 262,144 ($2^{18}$) rows and 1024 ($2^{10}$) columns.

The memory controller 116 accesses the DRAM 104 via a memory partition identifier set 122 including a chip select (CS[1:0]) identifier 124 to identify a particular chip module of the DRAM 104, a bank select (BS[1:0]) identifier 126 to identify a particular bank of the identified chip module, and a row select (RS[17:0]) identifier 128 and a column select (Col[9:0]) identifier 130 to identify a memory location at a particular row and a particular column, respectively, of the identified bank. The read data corresponding to a read access represented by the identifier set 122 or write data corresponding to a write access represented by the identifier set 122 is provided via a data bus 150 (DATA[63:0]) connecting the memory controller 116 and the DRAM 104. In the illustrated example, data is written to and read from the DRAM 104 as sixty-four bit words.

In operation, the processing components of the SOC 102 provide memory access requests to the memory controller 116 for the purposes of writing data to, or reading data from, the DRAM 104. The memory access requests, in one embodiment, include a linear address value (L_ADDR[31:0]) identifying a memory address associated with the memory access request, and if a write request, the data (DATA[63:0]) associated with the write request. In the example shown, the linear addresses (L_ADDR[31:0]) are thirty-two bit addresses capable of identifying up to approximately 4.3 billion memory locations.

In response to receiving the memory access request, the memory controller 116 prepares to access the requested memory location of the DRAM 104. As part of this preparation, the translation module 120 maps the linear address value (L_ADDR[31:0]) to a certain memory address output provided as particular values for each of the chip select (CS) identifier 124, bank select (BS) identifier 126, row select (RS) identifier 128, and column select (Col) identifier 130 of the memory partition identifier set 120 so as to identify the particular memory location represented by the linear address value. In the event that the memory access request is a write request, the memory controller 116 also provides the write data associated with the write request to the DRAM 104 via the data bus 150.

In response to the receipt of the identifiers of the memory partition identifier set 122, the DRAM 104 accesses the identified memory location. In the illustrated example, the value provided as chip select (CS) identifier 124 selects a particular chip module of the DRAM 104, the value provided as bank select (BS) identifier 126 selects a particular bank of the selected chip module, and the values provided for the row select (RS) identifier 128 and column select (Col) identifier 130 select the memory location at a particular row and column of the selected bank. In the event that the accessed row is not the currently open row of the bank, the DRAM 104 closes the currently open row and opens the selected row, which typically results in a delay compared to accessing an already open row of a bank. For read requests, the data in the identified memory location is provided to the memory controller via the data bus 150. For write requests, the data received at the DRAM 104 via the data bus 150 is written to the identified location.

In at least one embodiment, the translation module 120 utilizes a programmable mapping of linear addresses to particular values for the identifiers 124, 126, 128 and 130. The programmable mapping can include mapping the value at each of the bit locations of the linear address to an identified bit location of one of the identifiers 124, 126, 128 or 130. Tables 1 and 2 illustrate exemplary mappings that can be implemented by the translation module 120. As shown by Tables 1 and 2, the contiguous bit locations of the linear address can be mapped to contiguous bit locations of corresponding memory partition identifiers, or separate, non-contiguous bit locations of the linear address can be mapped, in order or out of order, to contiguous or non-contiguous bit locations of corresponding memory partition identifiers.

TABLE 1

| Linear Address | Memory Partition Identifier |
| --- | --- |
| L_ADDR[31:22] | Col[9:0] |
| L_ADDR[21:20] | CS[1:0] |
| L_ADDR[19:18] | BS[1:0] |
| L_ADDR[17:0] | RS[17:0] |

TABLE 2

| Linear Address | Memory Partition Identifier |
| --- | --- |
| L_ADDR[31:30] | CS[1:0] |
| L_ADDR[29] | BS[0] |
| L_ADDR[28:19] | Col[9:0] |
| L_ADDR[18:10] | RS[17:9] |
| L_ADDR[9:1] | CS[8:0] |
| L_ADDR[0] | BS[1] |

Further, the programmable mapping can include combining the values at one or more bit locations of the linear address to generate a value of a bit location of one of the control select signals, or otherwise basing the control select signals on values at identified bit locations of linear address value. As discussed in detail below with respect to FIGS. 3 and 4, the memory partition identifiers can be generated based on XOR operations or other logic operations performed on values from selected bit locations of the linear address value.

The one or more address mappings used by the translation module 120 of the memory controller 116 can be programmed in any of a variety of ways. For example, one or more registers 152 or the basic input/output system (BIOS) (not shown) of the system 100 can be programmed to store translation values representative of one or more desired mappings. Alternately, each program stream executed by the processing system 100 may include a subprocess that provides the translation value to the memory controller 116 upon a context switch or other activation of the program stream.

The translation module 120 can utilize the translation value to identify a particular mapping in any of a variety of ways. In one embodiment, the translation module 120 or other component of the system 100 stores a table of possible mappings and the translation value serves as an index to a particular mapping stored in the table. Alternately, the translation value represents a plurality of sub-values, each sub-value identifying a particular bit location of the linear address value that is mapped to the corresponding bit location of the corresponding memory partition identifier. Further, as discussed with respect to FIG. 2, a portion or all of the translation value can be used as mux select inputs to one or more multiplexers that output memory partition identifier values based on their mux select inputs. One of ordinary skill in the art can use the teachings provided herein to identify a particular mapping without departing from the scope of the present disclosure.

In at least one embodiment, the programmable mapping can be dynamically changed to accommodate different memory access schemes used by different program streams. To illustrate, when the CPU 108 or GPU 110 initiate a context switch to switch from a first program stream to a second program stream, part of the context switch can include switching from a first mapping suitable to the memory access scheme of the first program stream to a second mapping suitable to the memory access scheme of the second program stream. By switching mappings when processing at the CPU 108 or GPU 110 switches between program streams, the memory controller 116 can implement a mapping that results in reduced or minimal page thrashing for each program stream. It will be appreciated that care should be taken to ensure that different mappings do not result in the mapping of two different linear addresses to the same memory location or, in certain situations, do not result in the mapping of the same linear address to two different memory locations.

In an alternate embodiment, the processing system 100 may be used for only a particular set of processes whereby a particular mapping can be programmed when the processing system 100 is integrated into a device or other system. In these instances, the operation of the processing system 100 using different mappings can be modeled and the most suitable mapping can be selected from the modeling results. The memory controller 116 then can be programmed at implementation to utilize the identified mapping for memory access operations by the processing system 100.

Figure 2:
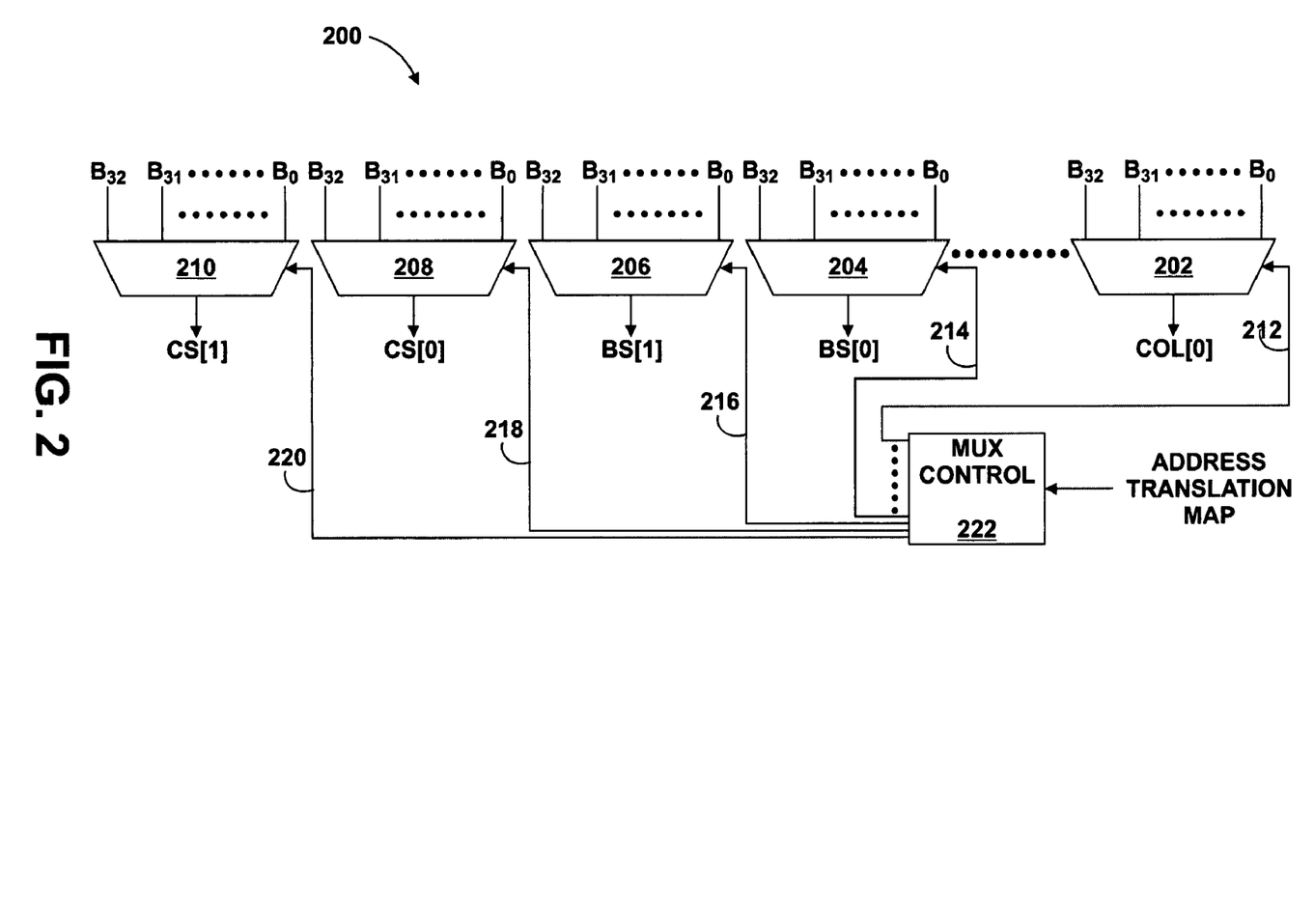
FIGS. 2 and 3 are block diagrams illustrating exemplary implementations of a programmable address translation module of the system of FIG. 1 in accordance with at least one embodiment of the present disclosure.

Referring to FIG. 2, an exemplary implementation of the translation module 120 is illustrated in accordance with at least one embodiment of the present disclosure. The translation module 120 includes a multiplexer (mux) fabric 200 and a mux control module 222. The mux fabric 200 includes a plurality of multiplexers, such as multiplexers 204, 206, 208, 210, and 212, each multiplexer having an output corresponding to a respective bit value of one of the chip select (CS) identifier 124, bank select (BS) identifier 126, row select (RS) identifier 128 or column select (Col[9:0]) identifier 130 (FIG. 1).

The mux control module 222 outputs a plurality of mux select signals, such as mux select signals 212, 214, 216 and 218, to direct the corresponding multiplexer to output the value received at a particular input. In one embodiment, the output signals 212-220 of the mux control module 222 are based on a particular address translation map identified by, or derived from, one or more programmable translation values. As noted above, a particular address translation map may be determined and set for a particular implementation of the processing system 100 (FIG. 1) or address translation maps may be switched as the processing system 100 switches between program streams.

In operation, a portion or all of the bit values of the linear address are provided as inputs to the multiplexers 202-210 of the mux fabric 200. In the illustrated example, the value at each of the thirty-two bits of the linear address L_ADDR[31:0] (illustrated as bits $B_{32}, B_{31}, \ldots, B_0$) are supplied to each of the multiplexers 202-210, which in turn are controlled by the mux control 222 to output the value received at the input indicated by the corresponding mux select signal provided to each multiplexer by the mux control module 222. The output value then can be used as the value at the bit location of one of the control select signals assigned to the multiplexer. For example, as shown, the multiplexer 202 is assigned to output the value for the first bit of the column select identifier 130 (i.e., Col[0]), the multiplexers 204 and 206 are assigned to output the values for the first and second bits of the bank select identifier 126 (i.e., BS[0] and BS[1], respectively), and the multiplexers 208 and 210 are assigned to output the values for the first and second bits of the chip select identifier 124 (i.e., CS[0] and CS[1], respectively). Other multiplexers (not shown) are assigned to output the values for the remaining bits of the column select identifier 130 (i.e., Col[9:1]) and the bits of the row select identifier 128 (i.e., RS[17:0]).

Figure 3:
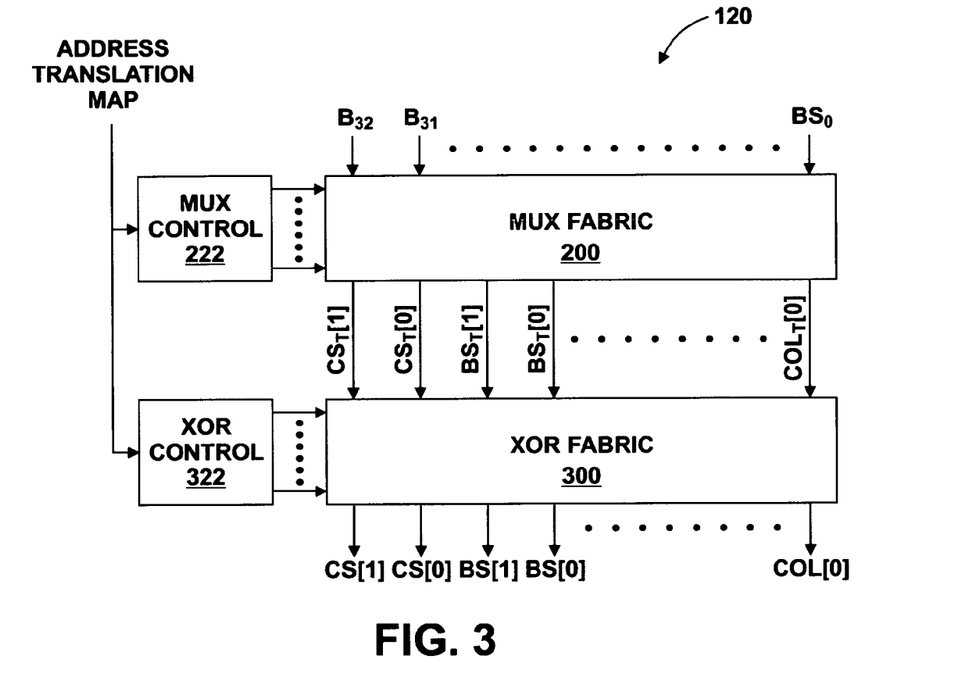
Figure 4:
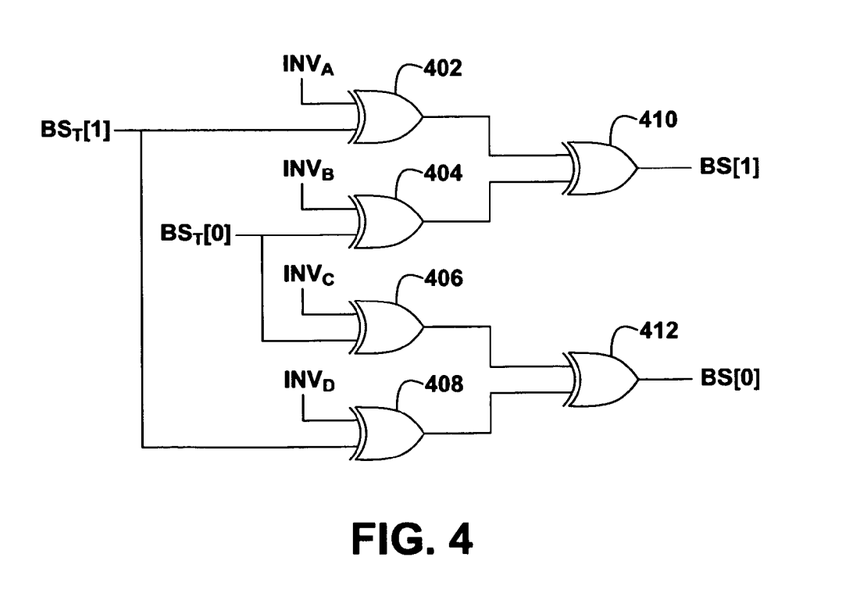
FIG. 4 is a logic diagram illustrating an exemplary logic circuit for generating a bank identifier using logic operations on address bit values in accordance with at least one embodiment of the present disclosure.

Referring to FIGS. 3 and 4, another exemplary implementation of the translation module 120 of the memory controller 116 is illustrated in accordance with at least one embodiment of the present disclosure. As shown, the translation module 120 of FIG. 3 includes the mux fabric 200 and mux control module 222 described with respect to FIG. 2. In some instances, it may be advantageous to map the linear address to the memory partition identifiers in a pseudo-random manner. Accordingly, to insert pseudo-randomness in the mapping of the linear address, the illustrated implementation of the translation module 120 further can include exclusive OR (XOR) fabric 300 having as inputs the outputs of the mux fabric 200 and being controlled by an XOR control module 322. The XOR fabric 300, in one embodiment, includes XOR logic and other logic so as to perform XOR operations or other logic operations on the bit values output by the mux fabric 200, where the results of these logic operations are provided as the bit values for the chip select (CS) identifier 124, bank select (BS) identifier 126, row select (RS) identifier 128, and column select (Col) identifier 130 so that they are, in effect, randomized. As such, rather than being the final bit values for the identifiers 124, 126, 128 and 130 as described above with respect to the implementation of FIG. 2, the output values provided by the mux fabric 200 serve as temporary bit values (designated $CS_T[1:0]$, $BS_T[1:0]$, $RS_T[17:0]$ and $COl_T[9:0]$) because the final bit values for the identifiers 124, 126, 128 and 130 may change as a result of the logic operations. The output bit values of the XOR fabric 300 are provided as the bit values for the memory partition identifiers 124, 126, 128 and 130 (e.g., CS[1:0], BS[1:0], RS[17:0] and Col[9:0]).

The XOR fabric 300 and the XOR control module 322 can be implemented so as to randomize bit values for the memory partition identifiers based on various combinations of the temporary bit values output by the mux fabric 300. To illustrate, the circuit diagram 400 of FIG. 4 illustrates the arrangement of XOR gates 402, 404, 406, 408, 410 and 412 within the XOR fabric 300, whereby the bit values BS[0] and BS [1] of the bank identifier 126 are determined based on XOR operations performed using the temporary bit values $BS_T[0]$ and $BS_T[1]$. The XOR control module 322 controls the values of the signals $inv_A$, $inv_B$, $inv_C$ and $inv_D$ provided as inputs to XOR gates 402, 404, 406 and 408, respectively.

Figure 5:
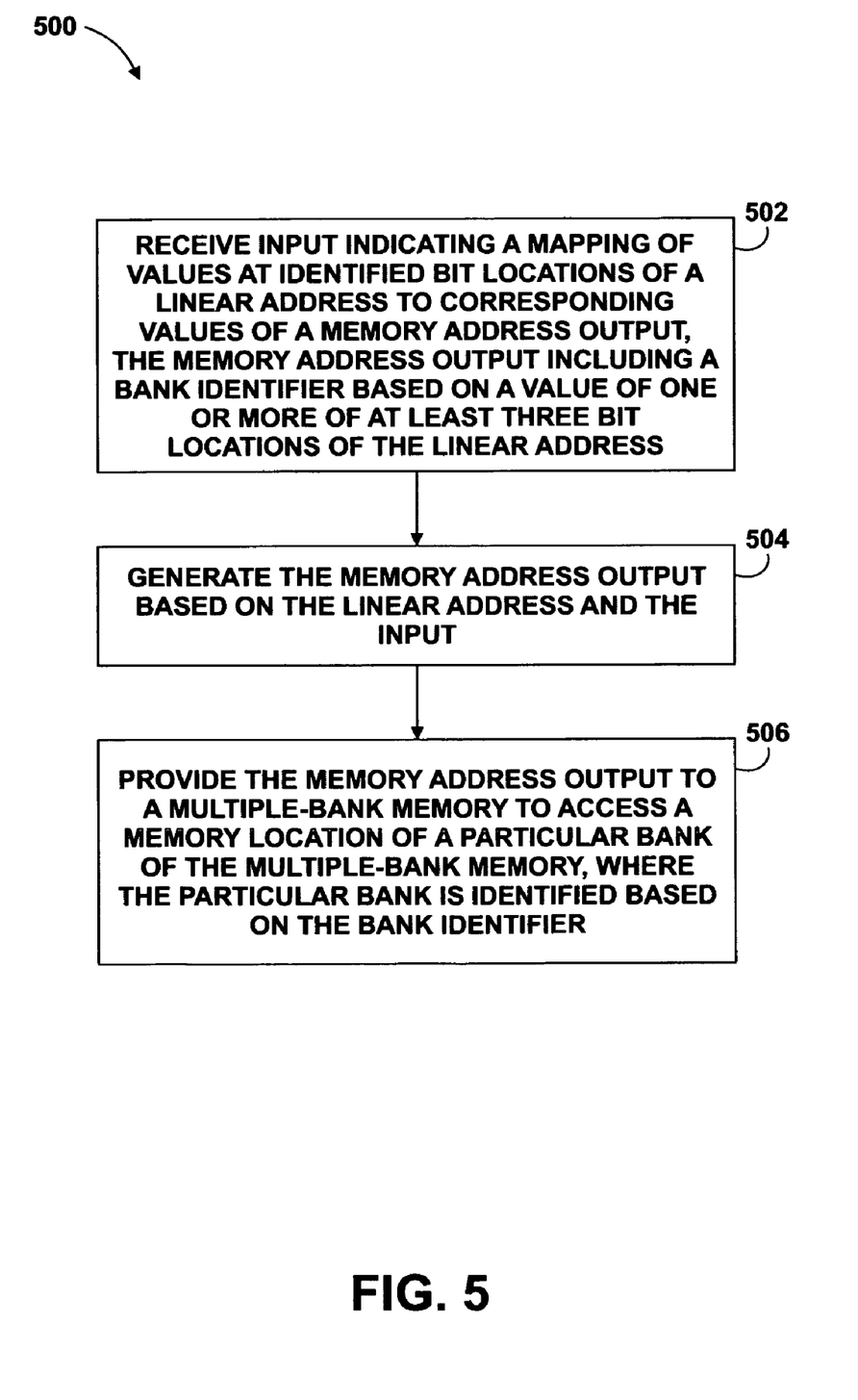
FIGS. 5 and 6 are flow diagrams illustrating exemplary methods for mapping a linear memory address to memory address output in accordance with at least one embodiment of the present disclosure.

Referring to FIG. 5, an exemplary method 500 for programmable mapping of a linear memory address to the chip select identifier, bank select identifier, column select identifier and row select identifier used to select a particular chip module, bank, row and column of a multiple-bank memory, such as DRAM, is illustrated in accordance with at least one embodiment of the present disclosure. At block 502, input indicating a mapping of values at identified bit locations of a linear address to corresponding values of a memory address output is received at a memory controller connected to a multiple-banked memory. The memory address output includes a bank identifier based on a value at one or more of at least three bit locations of the linear address. In one embodiment, a value of the input is programmable via, for example, a programmable register field or a BIOS. The memory address output further can include a column identifier based on a value at a one or more bit locations of the linear address and a row identifier based on a value at a one or more different bit locations of the linear address. The mapping of values can include one or more XOR operations of values at identified bit locations. At block 504, the memory address output is generated based on the linear address and the input. At block 506, the memory address output is provided to the multiple-bank memory to access a memory location of a particular bank of the multiple-bank memory, where the particular bank is identified based on the bank identifier.

Figure 6:
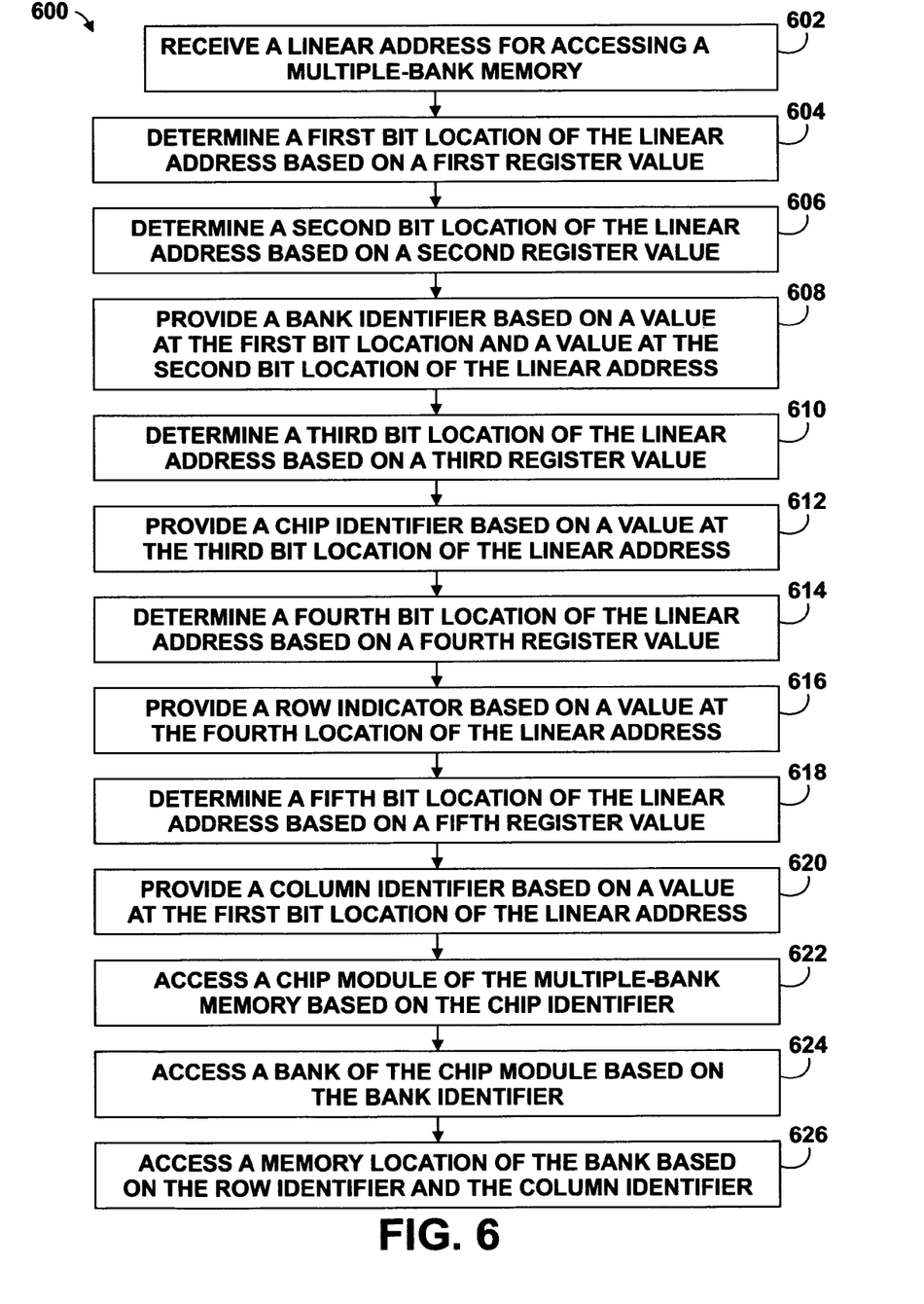

Referring to FIG. 6, an exemplary method 600 for accessing a multiple-bank memory using programmable linear memory address mapping is illustrated in accordance with at least one embodiment of the present disclosure. At block 602, a linear address for accessing the multiple-bank memory is received. At block 604, a first bit location of the linear address is determined based on a first register value. At block 606, a second bit location of the linear address is determined based on a second register value. The first and second bit locations are identifiable from at least three bit locations of the linear address. At block 608, a bank identifier based on a value at the first bit location and the second bit location of the linear address is provided.

At block 610, a third bit location of the linear address is determined based on a third register value, and at block 612 a chip identifier is provided based on the third bit location of the linear address. At block 614, a fourth bit location of the linear address is determined based on a fourth register value, and at block 616 a row identifier is provided based on a value at the fourth bit location of the linear address. At block 618, a fifth bit location of the linear address is determined based on a fifth register value, and at block 620 a column identifier based on a value at the fifth bit location of the linear address is provided. The first, second, third, fourth and fifth register values may include a portion or all of one or more values stored in a programmable register or BIOS. The chip identifier, the bank identifier, the row identifier, and the column identifier may be based on the outcome of one or more XOR or other logic operations performed using values a various bit locations of the linear address or a transitional mapped memory address output.

At block 622, a chip module of the multiple-bank memory is accessed based on the chip identifier. At block 624, a bank of the chip module is access based on the bank identifier. At block 626, a memory location of the bank is accessed based on the row identifier and the column identifier. Data may be read from or written to the access memory location.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   in response to executing a first program stream:
   implementing a first address mapping for the first program stream during an execution of the first program stream;
   receiving a first linear address for accessing a multiple-bank memory, the first linear address associated with the first program stream; and
   determining a first bank identifier based on the first linear address and the first address mapping;
   in response to a context switch from the first program stream to a second program stream:
   implementing a second address mapping for the second program stream, the second address mapping different than the first address mapping;
   receiving a second linear address for accessing the multiple bank memory, the second linear address associated with the second program stream;
   determining a second bank identifier based on the second linear address and the second address mapping;
   wherein determining the first bank identifier comprises:
   determining a first bit value at a first bit position of the first linear address and a second bit value at a second bit position of the first linear address, the first bit position and the second bit position based on the first address mapping; and
   performing an exclusive OR (XOR) operation using the first bit value and the second bit value to determine a value of a first bit of the first bank identifier and a value of a second bit of the first bank identifier.

2. The method of claim 1, wherein performing an XOR operation using the first bit value and the second bit value comprises:
   inverting the second bit value to generate a third bit value; and
   performing an XOR operation using the first bit value and the third bit value.

3. The method of claim 1, further comprising:
   accessing a first bank of the multiple-bank memory based on the first bank identifier to obtain a first data for the first program stream; and
   accessing a second bank of the multiple-bank memory based on the second bank identifier to obtain a second data for the second program stream.

4. The method of claim 1, further comprising:
   in response to executing the first program stream:
   determining a first row identifier based on the first linear address and the first address mapping; and
   in response to the context switch:
   determining a second row identifier based on the second linear address and the second address mapping.

5. The method of claim 4, further comprising:
   in response to executing the first program stream:
   determining a first column identifier based on the first linear address and the first address mapping; and
   in response to the context switch:

determining a second column identifier based on the second linear address and the second address mapping.

6. The method of claim 4, further comprising:
in response to executing the first program stream:
determining a first chip identifier based on the first linear address and the first address mapping; and
in response to the context switch:
determining a second chip identifier based on the second linear address and the second address mapping.

7. A method comprising:
executing a first program stream and a second program stream at a processor;
implementing a first address mapping for determining a first bank identifier from a first linear address associated with a first access to a multiple bank memory during the execution of the first program stream, the first address mapping associated with the first program stream;
implementing a second address mapping for determining a second bank identifier from a second linear address associated with a second access to the multiple bank memory during the execution of the second program stream, the second address mapping associated with the second program stream and different than the first address mapping;
wherein determining the first bank identifier comprises:
determining a first bit value at a first bit position of the first linear address and a second bit value at a second bit position of the first linear address, the first bit position and the second bit position based on the first address mapping; and
performing an exclusive OR (XOR) operation using the first bit value and the second bit value to determine a value of a first bit of the first bank identifier and a value of a second bit of the first bank identifier.

8. The method of claim 7, wherein performing an XOR operation using the first bit value and the second bit value comprises: inverting the second bit value to generate a third bit value; and performing an XOR operation using the first bit value and the third bit value.

9. The method of claim 7, further comprising:
accessing a first bank of the multiple-bank memory based on the first bank identifier to obtain a first data for the first access; and
accessing a second bank of the multiple-bank memory based on the second bank identifier to obtain a second data for the second access.

10. The method of claim 7, further comprising:
implementing the first address mapping for determining a first row identifier from the first linear address for the first access; and
implementing the second address mapping for determining a second row identifier from the second linear address for the second access.

11. The method of claim 7, further comprising:
implementing the first address mapping for determining a first column identifier from the first linear address for the first access; and
implementing the second address mapping for determining a second column identifier from the second linear address for the second access.

12. The method of claim 7, further comprising:
implementing the first address mapping for determining a first chip identifier from the first linear address for the first access; and
implementing the second address mapping for determining a second chip identifier from the second linear address for the second access.

13. A system comprising:
a processing unit to execute a first program stream and a second program stream;
a memory controller coupled to a multiple-bank memory and configured to:
implement a first address mapping for determining a first bank identifier for a first linear address associated with a first access to the multiple-bank memory during execution of the first program stream, the first address mapping associated with the first program stream;
implement a second address mapping for determining a second bank identifier for a second linear address associated with a second access to the multiple bank memory during the execution of the second program stream, the second address mapping associated with the second program stream and different than the first address mapping;
the memory controller comprises:
a mux fabric configured to determine a first bit value at a first bit position of the first linear address and a second bit value at a second bit position of the first linear address, the first bit position and the second bit position based on the first address mapping; and
an exclusive OR (XOR) fabric configured to perform an exclusive OR (XOR) operation using the first bit value and the second bit value to determine a value of first bit of the first bank identifier and a value of a second bit of the first bank identifier.

14. The system of claim 13, wherein the XOR fabric is configured to: invert the second bit value to generate a third bit value; and perform an XOR operation using the first bit value and the third bit value.

15. The system of claim 13, further comprising:
a table of address mappings; and
wherein the memory controller is configured to:
select an address mapping suitable for the first program from the table of address mappings as the first address mapping; and
select an address mapping suitable for the second program stream from the table of address mappings as the second address mapping.

16. The system of claim 13, further comprising:
the multiple-bank memory.

17. The system of claim 13, further comprising:
an integrated circuit comprising the processing unit and the memory controller.

* * * * *